(No Model.) 3 Sheets—Sheet 1.

J. W. FROST.
ELECTRIC TEST SYSTEM.

No. 367,205. Patented July 26, 1887.

ATTEST:
J. A. Hundle
John P. Wright

INVENTOR:
Joseph W. Frost.

By Edward P. Thompson
Attorney.

(No Model.) 3 Sheets—Sheet 2.
J. W. FROST.
ELECTRIC TEST SYSTEM.
No. 367,205. Patented July 26, 1887.
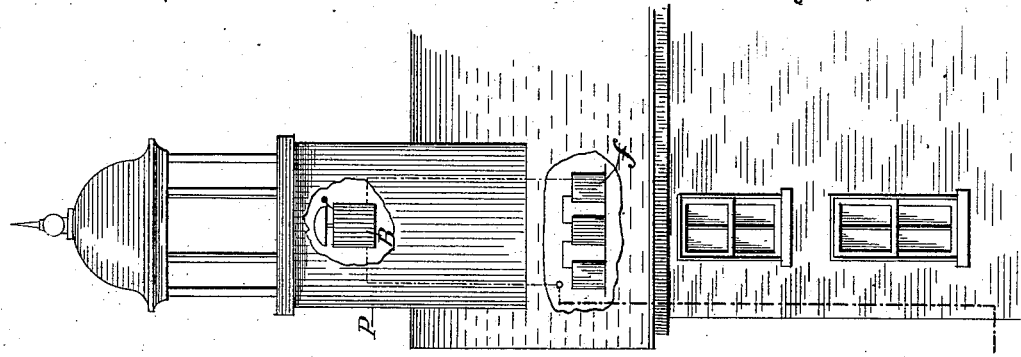
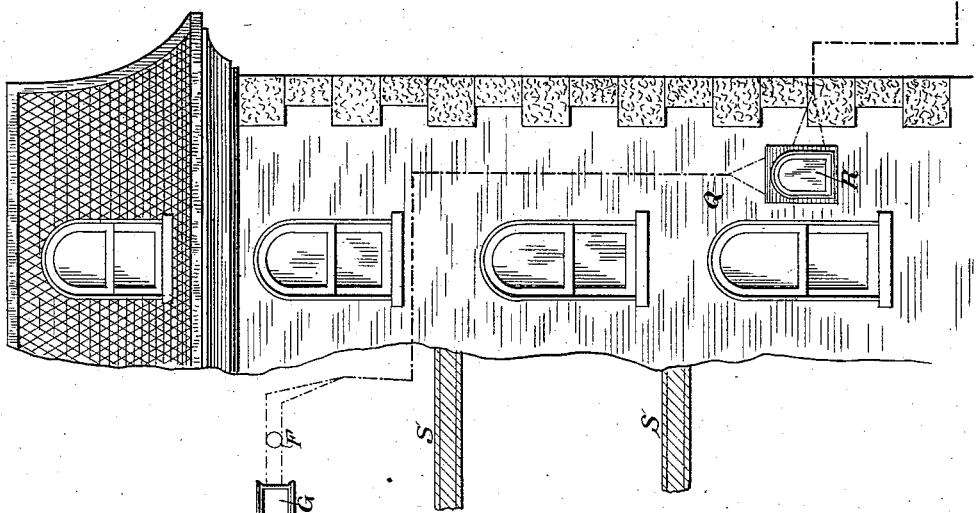
Fig. 2.
ATTEST:
J. Hurdle
John P. Wright
INVENTOR:
Joseph W. Frost,
By Edward P. Thompson.
Attorney (No Model.)
3 Sheets—Sheet 3.

J. W. FROST.
ELECTRIC TEST SYSTEM.

No. 367,205. Patented July 26, 1887.

ATTEST:
INVENTOR:
Joseph W. Frost.

UNITED STATES PATENT OFFICE.

JOSEPH W. FROST, OF ROCHESTER, NEW YORK.

ELECTRIC TEST SYSTEM.

SPECIFICATION forming part of Letters Patent No. 367,205, dated July 26, 1887.

Application filed September 25, 1886. Serial No. 214,506. (No model.)

*To all whom it may concern:*

Be it known that I, JOSEPH W. FROST, a citizen of the United States, and a resident of Rochester, in the county of Monroe, State of New York, have invented certain new and useful Improvements in Electric Test Systems, of which the following is a specification.

The present invention relates to an improved test system for the electric alarm system set forth in my application for Letters Patent Serial No. 173,971, filed March 11, 1886. So many of the elements of the said application are shown as are necessary to explain the present invention.

The object is to provide such a test that an inspector may, by simply operating one or two switches, ascertain if the circuits and apparatus of the alarm system are in order.

In order to illustrate the practical manner of carrying out the invention drawings are hereunto annexed and described, in which similar letters of reference represent corresponding elements, and in which each part referred to is designated by a single letter.

Figure 1:
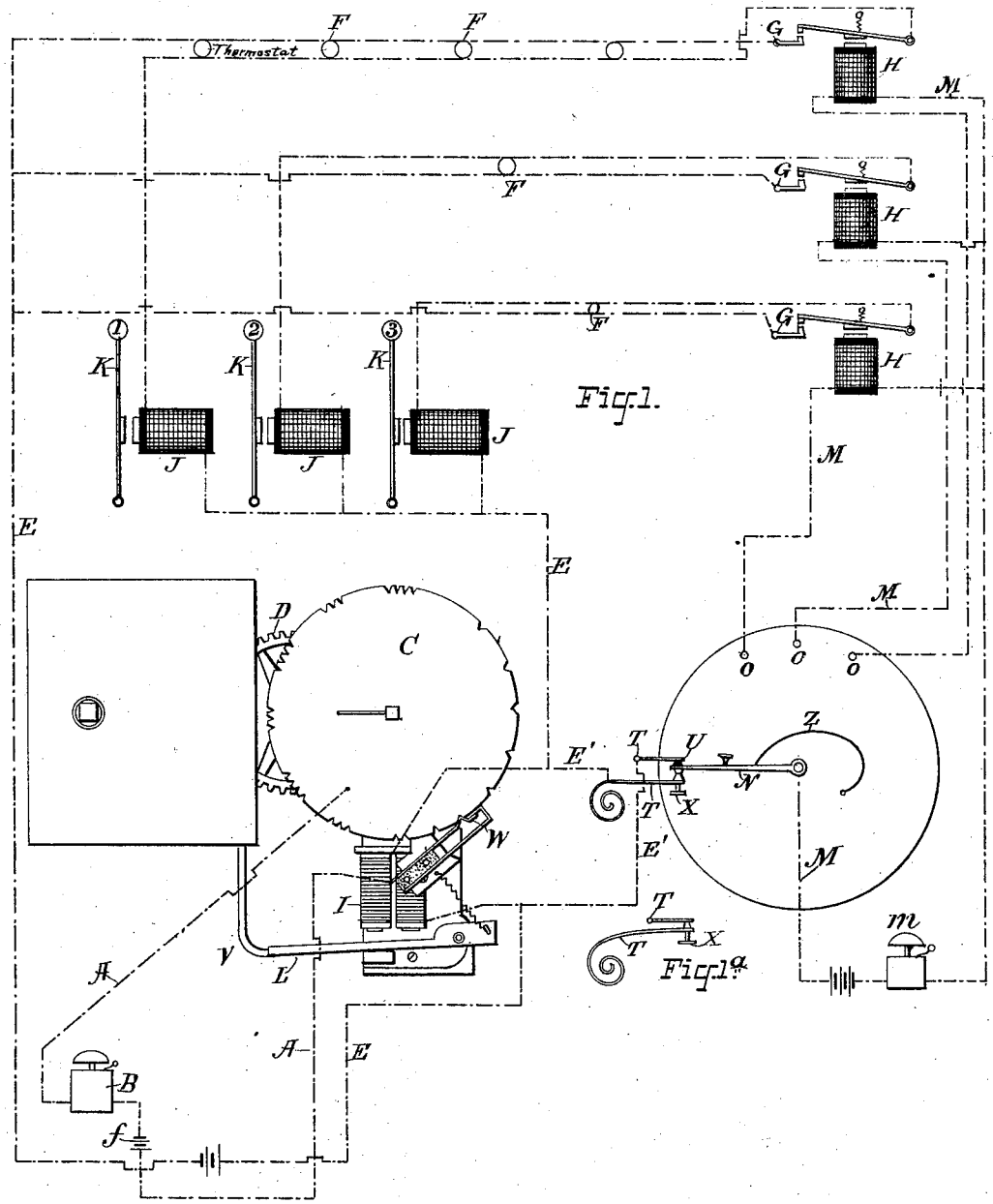
Figure 3:
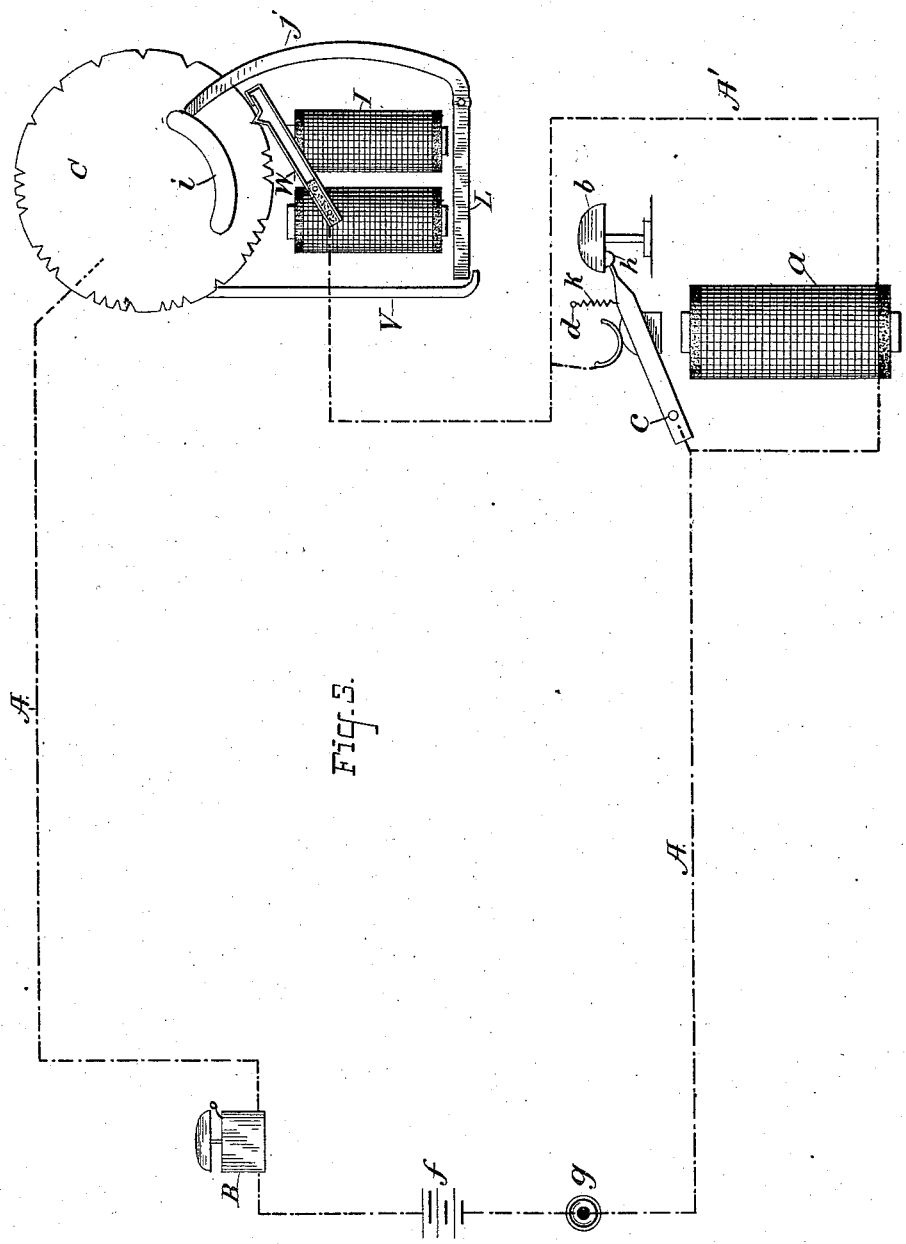

Figure 1 is a general view or diagram of the elements of the test system. Fig. 2 shows the relative locations of the principal elements of the system, and Fig. 3 shows details of a portion of the system whereby the circuit passing through a distant station may be tested.

In the system there are three circuits and an electric generator for each circuit. The first circuit, A, contains an electric audible signal, such as a bell, B, and a circuit-controller, such as a circuit-breaking wheel, C, which tends to rotate, because geared to a propelling mechanism, such as clock-work, D. The second circuit, E, includes an automatic circuit-closer, such as an electric thermostat, F, an electric magnetic circuit-closer—*i. e.*, a circuit-closer, G, having operating-connection with a magnet, H, which is located in the third circuit—the magnet I of an electro-magnetic tripping or starting device, L, for said wheel, and the magnet J of an annunciator, K, or similar visual signal. The circuit-closer G may broadly be called a "circuit-controller." As shown in the drawings, there are several of these circuit-closers. The third circuit, M, includes a switch, N, and a magnet, H, of said electro-magnetic circuit-closer, the said switch being normally open in said circuit at the contact O, and simultaneously normally open in a short circuit, E', to the said electro-magnetic tripping device magnet I. The spring Z maintains the switch in its normal position. The said audible signal B represents the usual fire-engine-house bell or similar central signal, located in the tower *p*, or other suitable place.

The visual signal K represents the usual annunciator, located in a central part of a hotel, Q, or similar structure, or upon the outside of the hotel near the street, and preferably in the same box, R, with the circuit-breaking wheel C and switch N, while the electromagnetic circuit-closer G and the thermostat F are located upon any given floor, S, of a house or similar structure.

Resting against the circuit-breaking wheel is a spring-contact, W, which is in the same circuit, A, as the wheel C. The armature L, or tripping device, normally presses upon the pendulum or lever V, to prevent the motion of the clock-work, which is geared in any convenient manner to the wheel C.

An inspector wishing to learn if the circuits are in order in any given house opens the box R with a key and turns the switch N to the first contact O. In doing this the two terminals T, which normally are pressed apart by N, which is insulated at U, spring together and short-circuit the tripping mechanism, so that the wheel will not turn, and thus give an unintentional alarm. When the switch touches the contact O, the circuit-closer H operates, and a current passes through the circuit E and operates the annunciator K, showing that everything is in order as far as the annunciator and thermostat circuit is concerned.

To test the fire-engine-signal circuit A, the inspector places the switch N upon any contact-point O and separates with his other hand the two springs T. A current then passes through the tripping-magnet I, the wheel C turns, (because its armature L releases the clock-work, which has operating-connection with the lever V,) and the circuit A is broken by the spring-contact W passing over the notch. Just as soon as this happens the inspector permits the two springs T to come together again, so that a signal may be given.

If the bell B rings when the notch thus passes over the contact-spring W, the circuit A is in order.

The abnormal position of the two springs or terminals T is shown at Fig. 1ª. The inspector can separate them by pulling downward the knob X, which is secured to the lower terminal T.

Referring to Fig. 3, means are seen for testing the circuit which passes from box R to the engine-house tower P. The said means consists of the combination of the circuit-breaking wheel C, a strip, $i$, secured to said wheel, said strip forming an arc of a circle whose center coincides with that of the wheel, a projecting lever, $j$, resting upon said strip, and having operating-connection with the armature L of the magnet I, a bell, B, battery $f$, and push-button $g$ in the circuit A, and located at the distant station or fire-engine house, an armature, $c$, and contact $d$ in said circuit A, the armature and contact being normally closed and the armature being provided with a knob, $h$, which rests against a bell, $b$, a magnet, $a$, belonging to said armature $c$ and in a branch circuit, A', which is short-circuited by the armature $c$. The addition of the elements $a$, $b$, $c$, $d$, $h$, A', $g$, and $i$ and $j$, afford means whereby the operator at the box R may know that the bell B has operated without the necessity of his hearing it himself. The strip $i$ in moving with the wheel holds the lever $j$ a little to the right of its normal position, so that although the magnet I is in circuit only when the wheel C begins to rotate, yet the latter will not stop until the end of the lever $j$ has passed the whole length of the strip $i$. This is because the lever $j$ maintains the armature L in such a position as to release the clock mechanism D. The notches in the wheel C cause a predetermined signal to be given at the bell B. After the clock-work has stopped, the operator at the box R pulls down the armature $c$ until it touches the magnet $a$. As the circuit A is closed through $a$ by this operation, the armature $c$ is retained until the attendant at the push-button $g$ breaks the circuit. The breaking of the circuit releases the armature, which is pulled back by the spring $k$ until it rings the bell $b$, thus letting the operator at the box R know that the circuit A is in good condition. How the wheel C is started is described hereinbefore.

The lever $j$, combined with the strip $i$, is called an "automatic regulator" for the tripping mechanism.

The elements $a$, $b$, $c$, $d$, $h$, and $k$ in practice are located in the box R.

It is evident that the invention is not limited to the precise construction hereinbefore described and shown, as many modifications may be made therein without departing from the spirit of the invention.

Having now stated the title, object, and nature of the invention, having stated the manner in which the same operates to accomplish the said object, what is claimed as patentable and useful is as follows:

1. The combination of three circuits, the first containing a circuit-controller and an electric signal, the second containing thermostats or similar automatic circuit-closers, an electro-magnetic circuit-closer, and an electro-magnetic tripping or starting device for said circuit-controller, which is geared to propelling mechanism, and an electric annunciator, and the third containing a switch which is normally open, and which is also normally open in a short circuit to the tripping device, and the magnets of said electro-magnetic circuit-closers, substantially as and for the purpose described.

2. The combination of two stations, the one containing electrical instruments to be tested and a switch, the other containing thermostats or similar automatic circuit-closers and auxiliary electro-magnetic circuit-closers, and two circuits, the one passing through the said instrument and said thermostats and the other passing through the said switch and the magnets of said auxiliary circuit-closers, which are normally open in said first circuit, substantially as and for the purpose described.

3. The combination, with a circuit containing electric thermostats located at one station and the releasing or tripping magnet of an electric-circuit controller at a second station, of a second circuit containing at the first station a circuit-closer for said first circuit and a switch at the second station normally open, the said circuit-controller being in a third circuit, which contains at a third station an electric signal, and each circuit being provided with a suitable generator, substantially as and for the purpose described.

4. The combination of an electro-magnetically operated annunciator, a circuit-controller geared to propelling mechanism, an electro-magnetic tripping or starting mechanism for said propelling mechanism, thermostats, normally-open circuit-closers, and three independent circuits, the first passing through the thermostats, the electro-magnetic circuit-closer, the tripping mechanism, and the annunciator, the second passing through the circuit-controller and containing an electric signal, and the third passing through the switch and the magnet which has operating-connection with said circuit-closer, the said switch being normally open in a short circuit to said tripping mechanism and normally open as to the circuits which pass through the magnets of said circuit-closers, for the purpose set forth.

5. In an electric test system, a circuit containing a moving signal-transmitting device, such as a circuit-breaking wheel, an electromagnet in a branch circuit to said first circuit, an armature to said magnet in a short circuit to said magnet and normally closed upon a suitable contact, the above-named elements being located at one station, and an electric signal and circuit-breaker, such as a push-button, being located at a distant station and in said first circuit, the said circuit including, also, an electric generator, substantially as and for the purpose described.

6. The combination of a circuit-breaker, such as a push-button, and an electric signal located at one station, and an electro-magnet and cut-out located at another station, all of said elements being in an electric circuit containing an electric battery, and the cut-out being in a short circuit to said magnet and normally closed, and the armature of said magnet having operating-connection with said cut-out, substantially as and for the purpose described.

7. The combination, with a moving circuit-breaking wheel, of a propelling mechanism therefor, an electro-magnetic tripping device for said mechanism, and an automatic regulator for said tripping device, the said regulator consisting of a concentric projection to said wheel and a lever having operating-connection with said tripping device and pressing upon said projection, substantially as and for the purpose described.

8. The combination, with a moving circuit-controller, of a propelling mechanism therefor, an electro-magnetic tripping device for said mechanism, and an automatic regulator for said tripping device, the said regulator consisting of a projection upon a movable part of said controller and a lever having operating-connection with said tripping device and pressing upon said projection, substantially as and for the purpose described.

In testimony that I claim the foregoing as my invention I have signed my name, in presence of two witnesses, this 23d day of September, 1886.

JOSEPH W. FROST.

Witnesses:
 EDWARD P. THOMPSON,
 PREBLE TUCKER.